United States Patent [19]

McConnell et al.

[11] Patent Number: 5,002,976

[45] Date of Patent: Mar. 26, 1991

[54] RADIATION CURABLE ACRYLATE POLYESTERS

[75] Inventors: JoAnn A. McConnell, Pendleton; F. Kurtis Willard; Morris A. Johnson, both of Louisville, all of Ky.

[73] Assignee: Radcure Specialties, Inc., Atlanta, Ga.

[21] Appl. No.: 313,876

[22] Filed: Feb. 23, 1989

[51] Int. Cl.⁵ .................... C08G 63/42; C08G 63/91; C08L 67/00
[52] U.S. Cl. .................................. 522/107; 525/41; 525/42; 525/921; 528/297; 522/108
[58] Field of Search .................. 522/107, 108; 525/41, 525/42, 921; 528/297

[56] References Cited

U.S. PATENT DOCUMENTS

| | | | |
|---|---|---|---|
| 3,089,863 | 5/1963 | Hicks et al. | 528/297 |
| 4,188,455 | 2/1980 | Howard | 522/97 |
| 4,659,778 | 4/1987 | Williams | 525/107 |

*Primary Examiner*—Marion E. McCamish
*Assistant Examiner*—Susan Berman
*Attorney, Agent, or Firm*—Herbert P. Price

[57] ABSTRACT

Acrylate polyesters are made by the reaction of a diol, a dibasic acid anhydride and glycidyl acrylate. When formulated into radiation curable compositions, the compositions can be used as coating, inks, and adhesives which cure at high rates when exposed to actinic radiation.

11 Claims, No Drawings

RADIATION CURABLE ACRYLATE POLYESTERS

BACKGROUND OF INVENTION

The field of art to which this invention pertains is radiation curable compositions.

Due to environmental concerns and the high cost of solvents, commercial interest in radiation curable compositions is constantly increasing. Legislation which restricts the amount of solvent and other pollutants that can be vented to the atmosphere is one reason for this increased interest. Other reasons are the concerns expressed by unions and individuals over the possible toxic effects of prolonged exposure to volatile organic materials and also the high cost of petroleum derived solvents. Generally, radiation curable systems are essentially 100 percent reactive systems, i.e., substantially all of the components react to produce the final product. Such systems can be cured by exposure to medium to high energy ionizing radiation or to actinic radiation in the presence of photoinitiators.

Various types of ethylenically unsaturated compounds have been used in making radiation curable compositions. Examples of such compounds include acrylated epoxide resins, such as those described in U.S. Pat. Nos. 3,676,398, 3,770,602, 4,072,529 and 4,511,732. Acrylated urethanes, such as those described in U.S. Pat. Nos. 3,700,643 and 4,511,732, have also been used in radiation curable compositions. Other acrylated urethane compounds made from a poly(alkylene oxide polyol), a polyisocyanate and an unsaturated active hydrogen-containing compound are described in U.S. Pat. Nos. 4,133,723 and 4,188,455. These urethane compounds are said to be radiation curable in the presence of oxygen.

Unsaturated polyesters based on maleic anhydride or fumaric acid have been used in combination with styrene and later with multifunctional acrylates as ultraviolet cured wood fillers and topcoats. The cure rates of these polyesters are slow due to the relatively unreactive nature of the unsaturated polyester internal double bond. In order to obtain faster curing compositions, acrylated polyesters have been developed. As described in U.S. Pat. No. 4,206,025, such polyesters are generally made by the direct esterification of a polyester polyol with acrylic acid.

Although acrylated polyesters are faster curing than unsaturated polyesters, they still cure slower than epoxy acrylates due to the absence of the beta-hydroxy group which has been shown to minimize the effects of oxygen inhibition during ultraviolet (UV) cure. The manufacture of such polyester acrylates involves a two step esterification reaction that can be complex, thereby affecting productivity and cost.

U.S. Pat. Nos. 3,089,863 and 4,659,778 describe a one step process for preparing polyesters by addition polymerization involving the reaction of a polyol, a dibasic acid anhydride and a wide range of monoepoxides. When the monoepoxide is glycidyl acrylate, a beta-hydroxy acrylic ester is formed.

SUMMARY OF THE INVENTION

This invention is directed to acrylated polyesters. In one aspect, this invention pertains to acrylated polyesters which are the reaction product of a polyoxyalkylene diol with a dibasic acid anhydride and glycidyl acrylate. In another aspect, this invention relates to radiation curable compositions based on acrylated polyesters.

The acrylated polyesters of this invention contains about 2 to about 6 unsaturated acrylic groups per molecule and are made by reacting a diol, a dibasic acid anhydride and glycidyl acrylate in the molar ratio of one mole of diol to about 2 to about 6 moles of dibasic acid anhydride and about 2 to about 6 moles of glycidyl acrylate wherein the moles of dibasic acid anhydride and glycidyl acrylate are equal. The diol is polyoxyethylene glycol or polyoxytetramethylene glycol having a molecular weight of about 650 to about 3000.

When blended with polyethylenically unsaturated radiation curable compounds and, optionally, monoethylenically unsaturated radiation polymerizable monomers, the compositions of this invention are utilized as coating, ink and adhesive compositions and can be cured by medium to high energy electrons or by ultraviolet light if a photoinitiator is added. These compositions cure at rates much higher than those of conventional acrylated polyesters.

DESCRIPTION OF THE INVENTION

The acrylated polyesters of this invention are made by the process described in U.S. Pat. No. 3,089,863, which is hereby incorporated by reference. The polyesterification process involves the reaction of a diol, a dicarboxylic acid anhydride and a monoepoxide. The reaction is a stepwise reaction which is initiated by the reaction of the diol with the anhydride to form an ester group and a carboxylic acid group. The carboxylic acid group then reacts with an epoxide group forming another ester group and a hydroxyl group. The hydroxyl group can then react with another anhydride group. The reaction will continue until terminated resulting in either a hydroxyl group or a carboxylic acid group functionality.

The diols used to make the polyesters of this invention are polyoxyethylene glycols and polyoxytetramethylene glycols having molecular weights of about 650 to about 3000, preferably about 1000 to about 2000. These polyoxyalkylene glycols are well known compositions which are made by ring opening polymerization of ethylene oxide and tetrahydrofuran, respectively.

The dicarboxylic acid anhydrides useful in this invention are certain cyclic anhydrides derived from dibasic acids wherein the carboxyl groups are attached to adjacent carbon atoms. These anhydrides have molecular weights of 98 to about 375. Examples of such anhydrides are maleic anhydride, succinic anhydride, phthalic anhydride, tetrahydrophthalic anhydride, hexahydrophthalic anhydride, nadic anhydride, nadic methyl anhydride, chlorendic anhydride, and the like.

The monoepoxide used to make the polyesters of this invention is glycidyl acrylate.

The polyesters of this invention contain on average about 2 to about 6, preferably about 3 to about 4, unsaturated acrylic ester groups per molecule. The polyesters are obtained by reacting the three components in the molar ratio of one mole of diol to about 2 to about 6 moles of anhydride and about 2 to about 6 moles of glycidyl acrylate. In the reaction, the moles of anhydride are equal to the moles of glycidyl acrylate so that the polyester is terminated with a beta hydroxyl group and not a carboxylic acid group. However, if it is desirable for the polyester to have an acid value, a slight excess of anhydride can be used.

The polyester can be prepared by mixing all of the components together and heating them until the esterification reactions are complete. However, preferably the anhydride and polyol are mixed together and heated to melt the anhydride if it is a solid and then the glycidyl acrylate is added incrementally. The reaction is conducted at a temperature of about 100° to about 140° C. until the reaction is complete as evidence by the disappearance of epoxy content and/or acid content.

When used in radiation curable compositions, the acrylated polyesters are usually blended with polyethylenically unsaturated radiation polymerizable compounds and, optionally, monoethylenically unsaturated radiation polymerizable monomers.

The polyethylenically unsaturated radiation polymerizable compounds which can be blended with the acrylated polyesters are compounds which contain two or more ethylenically unsaturated groups and, preferably, two to about six ethylenic groups. The ethylenically unsaturated groups are acrylate and methacrylate groups, vinyl groups and allyl groups. Compounds which contain the acrylate or methacrylate groups are acrylic or methacrylic esters of polyols wherein the polyols have two or more hydroxyl groups per molecule. Examples of such compounds are the diacrylic or dimethacrylic acid esters of ethylene glycol, propylene glycol, butanediol, butenediol, hexanediol, polyoxyethylene glycols, polyoxypropylene glycols, polyoxybutylene glycols, di-and triacrylic or methacrylic acid esters of glycerine and hexanetriol, trimethylolpropane, trimethylolethane, di-, tri-, tetra-, penta-, and hexa-acrylic or methacrylic acid esters of dipentaerythritol and the like. Other polyacrylates or methacrylates are the acrylated and methacrylated glycidyl ethers of dihydric phenols, acrylated and methacrylated epoxidized vegetable oils and acrylated and methacrylated urethanes.

The preferred polyethylenically unsaturated radiation polymerizable compounds are the acrylic acid esters of aliphatic polyols.

Monoethylenically unsaturated radiation polymerizable monomers which can be used in this invention are the well known monomeric compounds which contain one ethylenically unsaturated group per molecule. Examples of such monomers are alkyl acrylates and methacrylates wherein the alkyl group contains from 1 to 12 carbon atoms, mono and polyalkoxyalkylacrylates and methacrylates wherein the alkoxy groups and alkyl groups contain from 1 to 4 carbon atoms and wherein the molecules containing from 1 up to 20 alkoxy groups, hydroxyalkyl acrylates and methacrylates wherein the alkyl group contains from 2 to 6 carbon atoms, vinyl aromatic compounds, vinyl halides, vinyl pyrrolidone, vinyl pyridine, vinyl carbazole and the like.

The radiation curable compositions can be cured by any of the normal actinic radiation curing methods. The radiation can be ionizing radiation (either particulate or nonparticulate) or non-ionizing agents. As a suitable source of particulate radiation, one can use any source which emits electrons or charged nuclei. Particulate radiation can be generated by electron accelerators, such as the Van der Graff accelerator, resinous transformers, radioactive elements, such as cobalt 60, strontium 90, and the like. As a suitable source of nonparticulate non-ionizing radiation, any source which emits radiation in the range of from $10^{-3}$ angstroms to 2000 angstroms can be used. Suitable sources included vacuum ultra violet lamps, such as xenon or krypton arcs. As a suitable source of non-ionizing radiation, any source which emits radiation from 2000 angstroms to 4000 angstroms can be used. Suitable sources include mercury arcs, carbon arcs, tungsten filament lamps, sun lamps and lasers. All of these devices and sources are well known in the art and those skilled in radiation technology are fully aware of the manner in which radiation is generated and the precautions to be taken in its use.

When the radiation curable coating compositions are to be cured by exposure to non-ionizing radiation, e.g., ultraviolet radiation, photoinitiators are added to the composition. Suitable photoinitiators, which are well known in the art, include 2,2-diethoxy-acetophenone, 2,3 or 4-bromoacetophenone, benzaldehyde, benzoin, benzophenone, 9,10-dibromoanthracene, 4,4'-dichlorobenzophenone, 2,3-pentanedione, hydroxycyclohexyl phenyl ketone and xanthone. Such photoinitiators are generally added in amounts of from about 0.1 weight percent up to 10 weight percent based on the weight of the total curable composition and, preferably, 1 to 5 weight percent.

Photoactivators can also be used in combination with the photoinitiators. Examples of photoactivators are methylamine, tributylamine, 2-aminoethylethanolamine, cyclohexylamine, diphenylamine and tribenzylamine.

The radiation curable compositions are preferably used as coating, ink and adhesive compositions. The compositions can be applied by conventional means, including spraying, curtain coating, dip padding, roll coating and brushing procedures. The compositions can be applied to any acceptable substrate such as wood, metal, glass, fabric, paper, fiber, plastic, etc.

The radiation curable compositions can be made by blending the components in the amounts of about 20 to about 80 weight percent acrylated polyester, about 20 to about 80 weight percent polyethylenically unsaturated compound and 0 to about 50 weight percent monoethylenically unsaturated monomer wherein the weight percents are based on the total weight of the three components. Preferably, the compositions will contain about 50 to about 70 weight percent acrylated polyester, about 20 to about 30 weight percent polyethylenically unsaturated compound and about 10 to about 20 weight percent monoethylenically unsaturated monomer. The amounts of each component used will vary depending on the needed application viscosity and the properties required for the cured product.

Additional additives which can be used in the compositions include wetting agents, fillers, defoamers, dyes and pigments, the uses of which are well known in the art.

The following examples illustrate the invention in more detail. Parts and percentages are by weight unless otherwise designated.

EXAMPLE 1

To a suitable reactor equipped with agitator, condenser, temperature measuring device, and addition funnel were added 487 parts of polyoxytetramethylene glycol having an average molecular weight of 974, 222 parts of phthalic anhydride and 0.18 part of phenothiazine. Heat and agitation were applied raising the temperature to 284° F. in about 50 minutes, at which point a homogenous solution was obtained. 1.4 parts of chromium salt catalyst were added, the temperature was lowered to 260° F. and was held at 250°–260° F. for 2 hours. Glycidyl acrylate, 192 parts, and hydroquinone, 0.09 part, were added to the addition funnel. The temperature in the reactor was lowered to 230° F. and slow addition of the glycidyl acrylate was begun. The addition was completed in one hour. Heating at about 230° F. was continued for about 23 hours to complete the esterification reaction. Hydroquinone, 0.09 part, was added and heating was discontinued.

The resulting product had an epoxide equivalent weight of 91,000, an acid value of 1.89, a Gardner color of 4 and a viscosity of 3110 cps at 150° F.

EXAMPLE 2

Using the same procedure described in Example 1, an acrylated polyester was prepared by reacting 487 parts of polyoxytetramethylene glycol having an average molecular weight of 974 with 150 parts of succinic anhydride and 192 parts of glycidyl acrylate using the same catalysts and inhibitors described in Example 1. The resulting product had an epoxide equivalent weight of 42,800, an acid value of 4.17, a Gardner color of 3 and a viscosity of 2250 cps at 150° F.

EXAMPLE 3

Using the procedure described in Example 1, polyester acrylates were made by reacting long chain glycols with anhydrides and glycidyl acrylate in the mole ratios of 1 mole of glycol with 3 moles of anhydride and 3 moles of glycidyl acrylate. Polyester acrylates were made with the following long chain glycols.

| Polyoxytetramethylene glycol 250 | (PTMG 250) |
| Polyoxytetramethylene glycol 650 | (PTMG 650) |
| Polyoxytetramethylene glycol 1000 | (PTMG 1000) |
| Polyoxyethylene glycol 400 | (PEG 400) |
| Polyoxyethylene glycol 1000 | (PEG 1000) |
| Polyoxypropylene glycol 425 | (PPG 425) |
| Polyoxypropylene glycol 1010 | (PPG 1010) |

The numbers following "glycol" refers to the approximate molecular weight of the glycols.

Dicarboxylic acid anhydrides used to make the polyester acrylates were as follows:

Succinic anhydride (SA)
Phthalic anhydride (PA)
Hexahydrophthalic anhydride (HPA)
Dodecenyl succinic anhydride (DDSA)
Nadic methyl anhydride (NMA)
Chlorendic anhydride (CA)

Data relating to the polyester acrylates are shown in the following tables.

The abbreviations in the tables have the following meaning:

| Theor MW | Theoretical molecular weight |
| Wt/DB | Theoretical molecular weight per double bond |
| Visc | Viscosity |
| AV | Acid value |
| WPE | Weight per epoxide (epoxide equivalent weight) |
| Color | Gardner color |

Each of the polyesters shown in the tables has a theoretical unsaturated acrylic functionality of 3.

TABLE A

Polyester Acrylates with PTMG 250

| Polyester | Anhydride | Theor. M.W. | Wt/DB | Visc. @ 150° F. | AV | WPE | Color |
|---|---|---|---|---|---|---|---|
| A1 | SA | 934 | 311 | 2930 | 2.8 | 24,300 | 14 |
| A2 | PA | 1078 | 359 | 4760 | 4.8 | 26,600 | 6 |
| A3 | HPA | 1096 | 365 | 2240 | 0.5 | 38,700 | 7 |
| A4 | DDSA | 1432 | 477 | 1570 | 4.4 | 13,400 | 14 |
| A5 | NMA | 1168 | 389 | 4600 | 3.8 | 23,700 | 5 |
| A6 | CA | 1747 | 582 | Gel | | | |

TABLE B

Polyester Acrylates with PTMG 650

| Polyester | Anhydride | Theor M.W. | Wt/D.B | Visc. @ 150° F. | AV | WPE | Color |
|---|---|---|---|---|---|---|---|
| B1 | SA | 1334 | 445 | 3750 | 3.6 | 27,800 | 4 |
| B2 | PA | 1478 | 493 | 40,000 | 1.0 | 30,000 | 4 |
| B3 | HPA | 1496 | 499 | 790 | 4.0 | 93,300 | 4 |
| B4 | DDSA | 1832 | 611 | 940 | 5.9 | 38,000 | 14 |
| B5 | NMA | 1568 | 523 | 1230 | 4.2 | 30,600 | 5 |
| B6 | CA | 2147 | 716 | Gel | | | |

TABLE C

Polyester Acrylates with PTMG 1000

| Polyester | Anhydride | Theor M.W. | Wt/D.B | Visc. @ 150° F. | AV | WPE | Color |
|---|---|---|---|---|---|---|---|
| C1* | SA | 1684 | 561 | 2250 | 4.2 | 42,800 | 3 |
| C2** | PA | 1828 | 609 | 3110 | 1.9 | 91,000 | 4 |
| C3 | HPA | 1846 | 615 | 720 | 2.9 | 59,000 | 5 |
| C4 | DDSA | 2182 | 727 | 1490 | 3.8 | 22,400 | 12 |
| C5 | NMA | 1918 | 639 | 990 | 5.1 | 31,500 | 4 |
| C6 | CA | 2497 | 832 | 59,500 | 3.4 | 31,000 | 4 |

*Polyester of Example 2
**Polyester of Example 1

TABLE D

Polyester Acrylates with PEG 400

| Polyester | Anhydride | Theor M.W. | Wt/D.B | Visc. @ 150° F. | AV | WPE | Color |
|---|---|---|---|---|---|---|---|
| D1 | SA | 1084 | 361 | 2000 | 2.71 | 29,000 | 13 |
| D2 | PA | 1228 | 409 | 4590 | 1.4 | 20,000 | 13 |
| D3 | HPA | 1246 | 415 | 1090 | 1.9 | 80,300 | 5 |
| D4 | DDSA | 1582 | 527 | 4300 | 4.06 | 29,800 | 13 |
| D5 | NMA | 1318 | 439 | 2025 | 3.9 | 23,400 | 6 |
| D6 | CA | 1897 | 632 | Gel | | | |

TABLE E

Polyester Acrylates with PEG 1000

| Polyester | Anhydride | Theor M.W. | Wt/D.B | Visc. @ 150° F. | AV | WPE | Color |
|---|---|---|---|---|---|---|---|
| E1 | SA | 1684 | 561 | 600 | 5.2 | 49,700 | 15 |
| E2 | PA | 1828 | 609 | 3580 | 2.4 | 93,000 | 6 |
| E3 | HPA | 1846 | 615 | 375 | 3.7 | 95,000 | 13 |
| E4 | DDSA | 2182 | 727 | 635 | 4.4 | 28,000 | 12 |
| E5 | NMA | 1918 | 639 | 450 | 4.0 | 22,000 | 8 |
| E6 | CA | 2497 | 832 | 10,750 | 3.8 | 71,000 | 9 |

TABLE F

Polyester Acrylates with PPG 425

| Polyester | Anhydride | Theor M.W. | Wt/D.B | Visc. @ 150° F. | AV | WPE | Color |
|---|---|---|---|---|---|---|---|
| F1 | SA | 1109 | 370 | 2035 | 1.7 | 28,900 | 11 |
| F2 | PA | 1253 | 418 | 7675 | 0.7 | 21,700 | 10 |
| F3 | HPA | 1271 | 424 | 1475 | 1.4 | 74,300 | 5 |
| F4 | DDSA | 1607 | 536 | 1170 | 3.8 | 36,600 | 15 |
| F5 | NMA | 1343 | 448 | 2280 | 3.6 | 42,000 | 5 |
| F6 | CA | 1922 | 641 | Gel | | | |

TABLE G

| Polyester | Anhydride | Theor M.W. | Wt/D.B | Visc. @ 150° F. | AV | WPE | Color |
|---|---|---|---|---|---|---|---|
| G1 | SA | 1684 | 561 | 400 | 4.5 | 28,400 | 2 |
| G2 | PA | 1828 | 609 | 1590 | 2.9 | 47,000 | 3 |
| G3 | HPA | 1846 | 615 | 400 | 4.7 | 96,000 | 2 |
| G4 | DDSA | 2182 | 727 | 350 | 4.2 | 26,000 | 13 |
| G5 | NMA | 1918 | 639 | 475 | 4.3 | 34,000 | 3 |
| G6 | CA | 2497 | 832 | 18,000 | 4.0 | 41,000 | 4 |

Polyester Acrylates with PPG 1010

EXAMPLE 4

Each of the polyesters shown in the tables of Example 3 was formulated into radiation curable coating compositions as follows:

60 weight percent polyester acrylate
25 weight percent tripropylene glycol diacrylate
15 weight percent isobornyl acrylate
4 pph hydroxycyclohexylphenyl ketone Each of the coating compositions was drawn down on untreated aluminum Q panels with a No. 6 Mayer rod to give 0.5 mil films. The films were cured using two 300 watt/inch Fusion System electrodeless lamps at the maximum belt speed that gave a tack free film. The cure speed is shown in the following table as feet per minute, the higher the number the faster the cure.

Solvent resistance of the cured coatings was determined using methylethyl ketone (MEK) and is reported in number of double rubs. (Procedure described in "Radiation Curing" Vol. 10, No. 4, November, 1983, pp 8–13).

TABLE 4

Cure Speed and Solvent Resistance of Cured Polyester Acrylates

| Polyester | Cure Speed | Solvent Resistance |
|---|---|---|
| A1 | 50 | 8 |
| A2 | 25 | 60 |
| A3 | 15 | 54 |
| A4 | 2p @ 15 | 3 |
| A5 | 25 | 160 |
| A6 | — | — |
| B1 | 150 | 22 |
| B2 | 200 | 21 |
| B3 | 40 | 7 |
| B4 | 15 | 2 |
| B5 | 40 | 14 |
| B6 | — | — |
| C1 | 125 | 6 |
| C2 | 125 | 4 |
| C3 | 60 | 6 |
| C4 | 25 | 5 |
| C5 | 50 | 4 |
| C6 | 150 | 38 |
| D1 | + | + |
| D2 | 50 | 22 |
| D3 | 25 | 11 |
| D4 | 2p @ 15 | 8 |
| D5 | 25 | 84 |
| D6 | — | — |
| E1 | 50 | 3 |
| E2 | 125 | 2 |
| E3 | 50 | 2 |
| E4 | 15 | 2 |
| E5 | 50 | 2 |
| E6 | 150 | 4 |
| F1 | 25 | 9 |
| F2 | 25 | 35 |
| F3 | 2p @ 15 | 12 |
| F4 | 4p @ 15 | 2 |
| F5 | 15 | 13 |
| F6 | — | — |
| G1 | 15 | 2 |
| G2 | 25 | 2 |
| G3 | 2p @ 15 | 3 |
| G4 | tacky | tacky |
| G5 | 15 | 3 |
| G6 | 50 | 7 | p = passes
+ = incompatible in formulation
tacky = film could not be cured to tack free state

EXAMPLE 5

Several commercial polyester acrylates were formulated using the same amounts of components as described in Example 4. These formulations were cured at the maximum belt speed that gave a tack-free film and tested for solvent resistance as previously described. See Table 5.

TABLE 5

Cure Speed and Solvent Resistance of Commercial Polyester Acrylates

| Polyester | Cure Speed | Solvent Resistance |
|---|---|---|
| Synocure 3120 | 25 | 67 |
| Ebecryl 150 | 25 | 48 |
| Ebecryl 657 | 15 | 34 |
| Ebecryl 810 | 2p @ 15 | 130 |
| Ebecryl 830 | 15 | >200 |
| Aronix M-8030 | 2p @ 15 | >200 |
| Aronix M-8060 | 2p @ 15 | >200 |
| Aronix M-8100 | 15 | >200 |
| Setacure AP-575 | 15 | 195 |
| Photomer 5018 | 2p @ 15 | 52 |

The principles, preferred embodiments and modes of operation of the present invention have been described in the foregoing specification. The invention which is intended to be protected herein, however, it not to be construed as limited to the particular forms disclosed, since these are to be regarded as illustrative rather than restrictive. Variations and changes may be made by those skilled in the art without departing from the spirit of the invention.

What is claimed is:

1. A radiation curable acrylated polyester having about 2 to about 6 unsaturated acrylic groups per molecule, made by reacting (A) polyoxytetramethylene glycol having an average molecular weight of about 650 to about 1000, (B) succinic acid anhydride or phthalic acid anhydride, and (C) a glycidyl acrylate in the molar ratio of one mole of glycol to about 2 to about 6 moles of acid anhydride and about 2 to about 6 moles of glycidyl acrylate wherein the moles of acid anhydride and glycidyl acrylate are equal.

2. The acrylated polyester of claim 1 having about 3 to about 4 unsaturated acrylic groups per molecule.

3. A radiation curable composition comprising a blend of:

(A) about 20 to about 80 weight percent of an acrylated polyester;

(B) about 20 to about 80 weight percent of a polyethylenically unsaturated radiation curable compound different from (A); and (C) 0 to about 50 weight percent of a monoethylenically unsaturated radiation polymerizable monomer, wherein the weight percents are based on the total weight of (A), (B), and (C), and wherein said acrylated polyester (A) contains about 2 to about 6 unsaturated acrylic ester groups per molecule and is made by the reaction of:

(1) a diol;
(2) a dibasic acid anhydride; and
(3) glycidyl acrylate in the molar ratio of one mole of (1) to about two to about 6 moles of (2) and about two to about six moles of (3) wherein the diol is polyoxytetramethylene glycol having a molecular weight of about 650 to about 1000 and wherein the dibasic acid anhydride is succinic acid anhydride or phthalic acid anhydride.

4. The radiation curable composition of claim 3 wherein the acrylated polyester has about 3 to about 4 unsaturated groups per molecule.

5. The radiation curable composition of claim 3 containing
(A) about 50 to about 70 weight percent acrylated polyester;
(B) about 20 to about 30 weight percent polyethylenically unsaturated radiation polymerizable compound different from (A); and
(C) about 10 to about 20 weight percent monoethylenically unsaturated monomer.

6. The radiation curable composition of claim 3 wherein the polyethylenically unsaturated radiation curable compound is an acrylic acid ester of a polyol.

7. The radiation curable composition of claim 6 wherein the polyethylenically unsaturated radiation polymerizable compound is tripropylene glycol diacrylate.

8. The radiation curable composition of claim 3 wherein the monoethylenically unsaturated monomer is an alkyl acrylate or polyalkoxyalkylacrylates.

9. The radiation curable composition of claim 3 wherein the monoethylenically unsaturated monomer is isobornyl acrylate.

10. The radiation curable composition of claim 3 containing a photoinitiator.

11. The radiation curable composition of claim 10 wherein the photoinitiator is hydroxycyclophenyl ketone.

* * * * *